(12) United States Patent
Shikama et al.

(10) Patent No.: US 11,500,159 B2
(45) Date of Patent: Nov. 15, 2022

(54) OPTICAL CONNECTION STRUCTURE AND METHOD FOR FORMING SAME

(71) Applicant: Nippon Telegraph and Telephone Corporation, Tokyo (JP)

(72) Inventors: Kota Shikama, Tokyo (JP); Yuko Kawajiri, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/284,723

(22) PCT Filed: Oct. 8, 2019

(86) PCT No.: PCT/JP2019/039627
§ 371 (c)(1),
(2) Date: Apr. 12, 2021

(87) PCT Pub. No.: WO2020/085083
PCT Pub. Date: Apr. 30, 2020

(65) Prior Publication Data
US 2021/0356669 A1  Nov. 18, 2021

(30) Foreign Application Priority Data
Oct. 23, 2018  (JP) .............................. JP2018-198954

(51) Int. Cl.
*G02B 6/26* (2006.01)
(52) U.S. Cl.
CPC ..................................... *G02B 6/26* (2013.01)

(58) Field of Classification Search
None
See application file for complete search history.

(56) References Cited

U.S. PATENT DOCUMENTS

| 2013/0221550 A1* | 8/2013 | Koos | G02B 6/138 264/1.25 |
| 2015/0078712 A1* | 3/2015 | Brunner | G02B 6/4219 264/1.24 |

FOREIGN PATENT DOCUMENTS

JP  2008152173 A  7/2008

OTHER PUBLICATIONS

Billah et al., "Hybrid integration of silicon photonics circuites and InP lasers by photonic wire bonding," Optica, Research Article, vol. 5, No. 7, Jul. 2018, pp. 876-883. As discussed in specification.
Lindenmann et al., "Photonic wire bonding: a novel concept for chip-scale interconnects," Optics Express, vol. 20, No. 16, Jul. 30, 2012, pp. 17667-17677. As discussed in specification.

* cited by examiner

*Primary Examiner* — Chad H Smith
(74) *Attorney, Agent, or Firm* — Slater Matsil, LLP

(57) ABSTRACT

A first optical waveguide layer and a second optical waveguide layer are optically connected by a resin optical waveguide composed of a resin core composed of a light-transmitting resin and a cladding composed of air surrounding the resin core. A hollow outer wall structure that houses the resin optical waveguide is provided. An enclosed space is provided inside the outer wall structure. The outer wall structure is disposed to bridge the gap between the first optical device and the second optical device.

12 Claims, 3 Drawing Sheets

OPTICAL CONNECTION STRUCTURE AND METHOD FOR FORMING SAME

CROSS-REFERENCE TO RELATED APPLICATIONS

This application is a national phase entry of PCT Application No. PCT/JP2019/039627, filed on Oct. 8, 2019, which claims priority to Japanese Application No. 2018-198954, filed on Oct. 23, 2018, which applications are hereby incorporated herein by reference.

TECHNICAL FIELD

The present invention relates to an optical connection structure and a method of forming the same, and particularly relates to an optical connection structure and a method of forming the same that achieve an optical connection between optical fibers used in optical communication networks, an optical connection between an optical fiber and an optical device such as a laser, a photodiode, an optical waveguide, and an optical modulator, and an optical connection between optical devices.

BACKGROUND

Along with the progression of the optical communication network, there is a strong need for improvement in the degree of integration of the optical communication devices and miniaturization of the optical devices. In the related art, planar light wave circuits (PLC) composed of quartz glass with a glass core are widely used in optical circuits used as optical communications devices. This provides excellent coupling with an optical fiber and high reliability as a material, and is therefore applied to a wide variety of optical functional elements for optical communication such as a light splitter, a wavelength multiplexer demultiplexer, an optical switch, and a polarization control element.

In recent years, in order to deal with the above-described miniaturization of optical circuits, a research on an optical circuit having a high refractive index difference that is designed to have a small minimum bending diameter by increasing the refractive index of the core to increase the refractive index difference from the cladding has been developed. In addition, in recent years, a silicon photonics technique using a core composed of silicon having a strong light confinement property has progressed, and an optical circuit smaller than that of a glass type has been achieved. Silicon processes commonly used for an electronic component and the like can be applied to the silicon photonics technique.

A resin optical waveguide composed of a resin (synthetic resin) such as a transparent high molecular weight polymer is also well known. In addition, as a light modulating element, a wavelength conversion element, and an amplification element, an optical circuit including a core composed of a ferroelectric material typified by lithium niobate ($LiNbO_3$) and the like has also been widely used. In addition, as a light emitting element, a light receiving element, and a light modulating element, a group III-V semiconductor typified by indium phosphide (InP), gallium arsenide (GaAs) and the like are also available, and the light emitting element, the light receiving element, the light modulating element, and the like of an integrated optical circuit type including these semiconductors with an optical wave guiding mechanism have also been widely used. The ferroelectric or semiconductor optical waveguides also have a greater refractive index than glass and provide a strong light confinement, and as such, miniaturization of the circuit can be expected. The above-described optical functional elements are collectively referred to simply as an optical device.

Along with the above-described miniaturization of the optical device, the demand for miniaturization of the optical input/output part of the optical waveguide is increasing. In the related art, in an example of optical connection (light connection) at the optical input/output part of a quartz glass-based PLC, the connection pitch cannot be set to a value equal to or smaller than the cladding diameter of the optical fiber, and therefore the optical connection to the optical fiber is typically performed after the connection pitch is expanded on the optical circuit. As such, the optical connection of the PLC has a problem in that the connection pitch imposes a limitation such that the entire optical device cannot be miniaturized when the optical input/output part is included. Therefore, there is a demand for a technique for optical connection at a pitch equal to or smaller than the pitch that is limited by the cladding diameter of the optical fiber.

Commonly, for optical connections between optical fibers, between an optical fiber and an optical device, and between optical devices, a butt coupling technique is known in which the optical connection is performed in the state where connection end surfaces orthogonal to the optical axis of the optical device are disposed to face each other and are positioned such that their axes of the core positions are not shifted from each other. Furthermore, a spatial connection is also widely used that connects, again to the optical device, a light beam emitted from a connection end surface orthogonal to the optical axis of the optical device by collecting the light beam through a spatial optical system such as a lens.

Disadvantageously, the above-described butt coupling technique has a significant limitation on installation in terms of matching of the thermal expansion coefficient and the mode diameter of the guided light in addition to the necessity to dispose the optical connection surfaces of the optical devices in a facing relationship. In addition, the spatial optical coupling also has a limitation of the expansion of the beam diameter and a limitation on manufacture of micro lenses, mirrors, and the like, and miniaturization of the connection pitch and improvement in mass manufacturability are technically limited.

As a technique for removing the above-described limitations, a technique for connecting between optical devices with a resin optical waveguide has been proposed. For example, there is a method of guiding light within a resin to optically connect (optical connection) between optical fibers, between an optical fiber and an optical device, and between optical devices by producing any optical three-dimensional wiring pattern by an optical connection using a self-written waveguide or a nano-level stereolithography technique using the two-photon absorption disclosed in Non Patent Literature 1.

This is a technique for stereolithography achieved by immersing a resist solution or the like, which is a raw material of the resin, on a substrate, concentrating a light beam from a laser through a lens or the like, inducing two-photon absorption at a light collecting portion of the light beam to cure only the resin at the light collecting portion, and further performing scanning with the laser to move the light collecting portion in any direction. The technique is also known as a stereolithographic three-dimensional printer.

In particular, the technique of stereolithography using two-photon absorption, which is well known to have a very small light collection size, can achieve nano-level stereo-lithography when used with a micro-driven scanning unit. There is a method for optical connection to an optical device to be connected by using the above-described technique and using micro-resin optical wiring (optical waveguide) with a core composed of a resin itself shaped as disclosed in Non Patent Literature 1.

CITATION LIST

Non Patent Literature

Non Patent Literature 1: N. Lindenmann et al., "Photonic Wire Bonding: a novel concept for chip-scale interconnects", Optics Express, vol. 20, no. 16, pp. 17667-17677, 2012.

SUMMARY

Technical Problem

As described above, in the optical connection structure in a micro region, the resin optical waveguide is bent at a very small curvature radius. For the bending at a small curvature radius, it is important to strictly confine the light with the resin optical waveguide for the purpose of reducing the light radiation loss due to the bending. For this purpose, it is necessary to increase the refractive index difference between the cladding and the core constituting the resin optical waveguide. Since the refractive index of the resin of the core is typically approximately 1.3 to 1.6, air, with a refractive index of 1, is used as the cladding in order to increase the refractive index difference. However, when the resin optical waveguide is configured to be exposed to the outside with the cladding composed of air, there is a problem in that the surrounding dust, debris and the like are attached to the core part, and the ideal waveguide structure is impaired by the attached portion, which leads to an increase in the radiation loss of the light or the like.

To solve the above-mentioned problems, an object of embodiments of the present invention is to suppress light radiation loss in a resin optical waveguide including a cladding composed of air.

Means for Solving the Problem

An optical connection structure according to embodiments of the present invention includes a first optical device including a first optical waveguide layer at which an optical waveguide is formed, a second optical device including a second optical waveguide layer at which an optical waveguide is formed, a resin optical waveguide including a resin core composed of a light-transmitting resin, the resin optical waveguide being configured to optically connect the first optical waveguide layer and the second optical waveguide layer, and an outer wall structure having a hollow shape and configured to house the resin optical waveguide, in which a portion of the resin optical waveguide is composed of the resin core and a cladding composed of air surrounding the resin core.

In one configuration example of the optical connection structure above, the outer wall structure is composed of the resin.

In one configuration example of the optical connection structure above, a support beam configured to support and fix the resin core to an inner wall of the outer wall structure is provided.

In one configuration example of the optical connection structure above, the resin core is optically connected in a thermally insulating manner to at least one of the first optical waveguide layer and the second optical waveguide layer by making contact at a side surface of a portion of the resin core along a waveguide direction of a core of the optical waveguide of at least one of the first optical waveguide layer and the second optical waveguide layer.

In one configuration example of the optical connection structure above, both an end surface of the resin core and a connection end surface of a core of the optical waveguide of at least one of the first optical waveguide layer and the second optical waveguide layer are formed perpendicular to a waveguide direction and are optically connected through butt coupling.

A method of forming an optical connection structure according to embodiments of the present invention includes preparing a first optical device including a first optical waveguide layer at which an optical waveguide is formed, and a second optical device including a second optical waveguide layer at which an optical waveguide is formed, curing a photo-curable resin through irradiation with exposure light for exposure to form a resin core including the photo-curable resin that is photo-cured, and optically connecting the first optical waveguide layer and the second optical waveguide layer by a resin optical waveguide including the resin core and a cladding composed of air surrounding the resin core, and forming an outer wall structure having a hollow shape and configured to house the resin optical waveguide, in which the photo-curable resin serves as a light-transmitting resin when the photo-curable resin is photo-cured.

Effects of Embodiments of the Invention

As described above, according to embodiments of the present invention, the resin core of the resin optical waveguide that optically connects the first optical waveguide layer and the second optical waveguide layer is housed in the hollow outer wall structure, and it is thus possible to achieve an excellent effect of suppressing light radiation loss due to attachment of foreign materials and the like in the resin optical waveguide including the cladding composed of air.

DETAILED DESCRIPTION OF ILLUSTRATIVE EMBODIMENTS

An optical connection structure according to an embodiment of the present invention is described below.

First Embodiment

Figure 1:
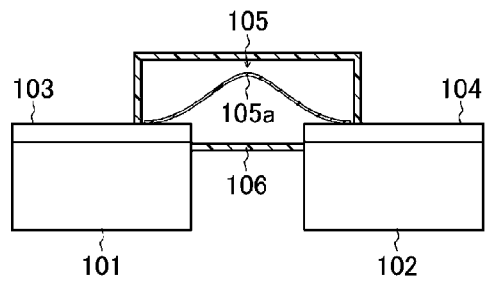
FIG. 1 is a cross-sectional view illustrating a configuration of an optical connection structure according to a first embodiment of the present invention.
Figure 2:
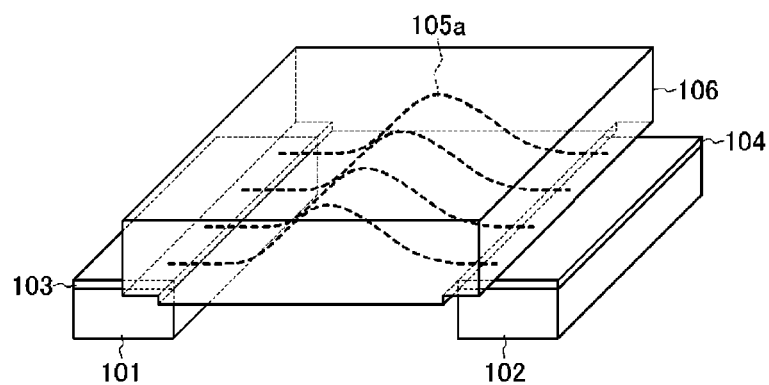
FIG. 2 is a perspective view illustrating a configuration of the optical connection structure according to the first embodiment of the present invention.

First, an optical connection structure of a first embodiment of the present invention is described with reference to FIGS. 1 and 2.

The optical connection structure includes a first optical device 101 and a second optical device 102, and a first optical waveguide layer 103 of the first optical device 101 and a second optical waveguide layer 104 of the second optical device 102 are optically connected (optical connection) by a resin optical waveguide 105. The resin optical waveguide 105 is composed of a resin core 105a composed of a light-transmitting resin, and a cladding composed of air surrounding the resin core 105a. In the first embodiment, for example, the resin core 105a is optically connected in a thermally insulating manner to at least one of the first optical waveguide layer 103 and the second optical waveguide layer 104 by making contact at a side surface of a portion of the resin core along the waveguide direction of the core of the optical waveguide of at least one of the first optical waveguide layer 103 and the second optical waveguide layer 104.

Note that while the propagation distance of the resin optical waveguide 105 is small, the resin constituting the resin core 105a preferably has a high transmittance at the wavelength of light input and output to and from the optical device. In addition, while the resin core 105a may have any cross-sectional dimension as long as it propagates light, it is preferable that the diameter be small in the region where the micro-bending for sharply changing the waveguide direction is performed. In addition, in the resin optical waveguide 105, the entire region of the cladding may not be composed of air, but the cladding is preferably composed of air in the region where the micro-bending is performed.

In addition, the optical connection structure includes a hollow outer wall structure 106 that houses the resin optical waveguide 105. Inside the outer wall structure 106, an enclosed space is formed, for example. The outer wall structure 106 is disposed to bridge the gap between the first optical device 101 and the second optical device 102, for example. The outer wall structure 106 may be composed of a resin, for example. In this case, the outer wall structure 106 may be composed of the same resin as the resin core 105a. In addition, the outer wall structure 106 is not limited to resin, and may be composed of glass, semiconductor, metal, or the like.

Here, the resin optical waveguide 105 is composed of the resin core 105a and the cladding composed of air surrounding the resin core 105a. Accordingly, the outer wall structure 106 is formed such that the outer wall structure 106 is spaced apart from the resin core 105a so as to sufficiently ensure the region serving as the cladding of the resin optical waveguide 105 between the inner wall of the outer wall structure 106 and the resin core 105a.

For example, a plurality of optical waveguides is formed at the first optical waveguide layer 103, and a plurality of optical waveguides is formed also at the second optical waveguide layer 104. It is possible to adopt a configuration in which a plurality of the resin optical waveguides 105 corresponding to the above-mentioned optical waveguides is provided. In this case, the resin optical waveguides 105 optically connect the respective optical waveguides of the first optical waveguide layer 103 and the respective optical waveguides of the second optical waveguide layer 104. Also in this case, the outer wall structure 106 houses the plurality of resin optical waveguides 105 and the plurality of resin optical waveguides 105 is covered with the outer wall structure 106.

As described above, in the first embodiment, the side surface of the end portion of the resin core 105a makes contact with the top surface of the optical waveguide core of the first optical waveguide layer 103 along the propagation direction of the light, and thus the optical waveguide core and the resin core 105a are coupled to each other in a thermally insulating manner. The same applies to the optical waveguide core of the second optical waveguide layer 104 and the resin core 105a. This is a technique in which, with an optical waveguide, such as a rib-type waveguide, in which the upper cladding is composed of air and the core is exposed, the resin core 105a is formed on the top surface of the exposed core with its side surface in contact with the top surface along the core optical axis, so as to achieve low-loss optical connection by optically coupling them in a thermally insulating manner through evanescent coupling of exuded guided light guided through the optical waveguide core of the first optical waveguide layer 103, for example. Note that, even in the case where the core is not exposed, a thermally insulating optical coupling can be achieved when a large amount of light exudes to the cladding from the core, and the cladding is thin.

In the resin optical waveguide 105, the cladding is composed of air, and the refractive index difference between the resin core 105a and the cladding is greater than that of a case where the cladding is composed of a resin or the like. In addition, the diameter of the resin core 105a is set to a diameter as small as approximately 5 µm. As described above, the resin optical waveguide 105 has a strong light confinement effect due to the high refractive index difference. Therefore, the resin optical waveguide 105 can guide light with no radiation loss even when bent in the waveguide direction at a small curvature.

For example, when the optical axes of the optical waveguides to be optically connected are shifted from each other between the first optical device 101 and the second optical device 102, they cannot be linearly connected and the resin optical waveguide 105 has to be partially bent. Additionally, in the case where the first optical device 101 and the second optical device 102 are close to each other, the curvature of the bent portion of the resin optical waveguide 105 has to be small to house the resin optical waveguide 105 in a smaller region. Even in the case where the first optical device 101 and the second optical device 102 are close to each other and the optical axes of the optical waveguides to be optically connected are shifted from each other as described above, the optical waveguides to be optically connected can be optically connected with no radiation loss by using the resin optical waveguide 105 having a strong optical confinement effect.

According to the first embodiment, the resin optical waveguide 105 is housed in the state where it is covered with the outer wall structure 106, and it is thus possible to suppress the attachment of the surrounding dust, debris and the like to the resin core 105a. By providing the outer wall structure 106 to suppress the attachment of dust and the like to the resin core 105a, light radiation loss can be suppressed, and a low-loss property can be reliably maintained. This effect is enhanced when the outer wall structure 106 has an airtight structure. In addition, the resin core 105a can be prevented from being accidentally touched and broken, and the mechanical reliability can be increased.

While the optical connection structure according to the first embodiment of the present invention is described above with an example in which the two optical devices, the first optical device 101 and the second optical device 102, are optically connected to each other, this is not limitative. The same applies to a case where three or more optical devices are optically connected to each other. For example, the optical connection structure according to the first embodiment of the present invention may be applied in exactly the same manner to an optical connection between an optical fiber array and respective optical waveguide devices.

Note that in the optical waveguides provided in the first optical waveguide layer 103 and the second optical waveguide layer 104, the core may be composed of a silicon fine wire and the cladding may be composed of silicon oxide, for example. This optical waveguide may be formed of a well-known silicon on insulator (SOI) substrate, for example. To form the optical waveguide, first, a surface silicon layer of an SOI substrate is patterned by a known photolithography technique, etching technique, or the like to form a core layer that constitutes the optical waveguide (optical circuit). Next, for example, silicon oxide is deposited by a well-known deposition method such as plasma CVD to form a cladding, and thus an optical waveguide is obtained.

In addition, the first optical device 101 and the second optical device 102 are not limited to the above-described optical waveguide composed of a silicon fine wire, and it is possible to adopt a planar light wave circuit including a core composed of quartz glass formed through deposition on a silicon substrate, for example. In addition, the first optical device 101 and the second optical device 102 may be composed of optical waveguide devices having other optical waveguide features. For example, the first optical device 101 and the second optical device 102 may be composed of a optical waveguide device using, as the substrate and the optical waveguide, an organic polymer, a semiconductor or compound semiconductor waveguide of Si, silicon nitride (SiN), gallium arsenide, indium phosphorus (InP) or the like, and a dielectric such as lithium niobate (Ln) and periodically poled lithium niobate (PPLN), as well as quartz glass.

In addition, in the case of an optical device that propagates, inputs and outputs light, such functions are adaptable to the first optical device 101 and the second optical device 102. For example, the first optical device 101 and the second optical device 102 may be composed of a light emitting element such as a laser, a light receiving element such as a photodiode, a light modulator or the like as well as the optical waveguide. In addition, the first optical device 101 and the second optical device 102 may include any optical functional elements such as an optical amplifier, an isolator, a polarization rotation and separation element, and a light attenuator. In any case, the first optical device 101 and the second optical device 102 include an optical waveguide.

While various types of optical circuits for processing signals and various types of optical functional elements for operations such as emission, reception, modulation and control are integrated in the first optical device 101 and the second optical device 102, a feature of embodiments of the present invention is the optical connection structure between the optical waveguides, rather than the circuit configuration or the function of the circuit.

Next, a method of forming the optical connection structure is described. The resin core 105a and the outer wall structure 106 can be formed by stereolithography.

For example, the resin core 105a and the outer wall structure 106 can be formed by a photolithography technique using ultraviolet radiation at the exposure wavelength of the photo-curable resin. Specifically, first, the first optical device 101 including the first optical waveguide layer 103 at which an optical waveguide is formed, and the second optical device 102 including the second optical waveguide layer 104 at which an optical waveguide is formed are prepared (first step). Next, a photo-curable resin such as a UV curable resin and a negative photoresist typified by SU-8 is applied to the location in which to form the resin core 105a in the first optical device 101 and the second optical device 102. Alternatively, instead of applying the photo-curable resin, the first optical device 101 and the second optical device 102 are immersed in a container containing the photo-curable resin.

In this state, with an optical system or a light source using a motor, a piezo stage, or the like, the formation region of the resin core 105a is sequentially irradiated with exposure light to selectively photo-cure the irradiated part, and form a portion (latent image) that serves the resin core 105a.

In addition, the resin core 105a and the outer wall structure 106 can be formed also by stereolithography using a femtosecond laser having a wavelength longer than the exposure wavelength of the photo-curable resin. In this stereolithography, a two-photon absorption under a non-linear effect occurs only at a location where a certain light intensity is collected, and the photo-curable resin at this location can be photo-cured. In stereolithography using a femtosecond laser, nano-level stereolithography can be performed more precisely than the above-described photolithography technique using the light source of the exposure wavelength.

After the portion that serves the resin core 105a is photo-cured by the stereolithography technique, the photo-curable resin in the uncured region is removed to form the resin core 105a (second step). After the resin core 105a is formed, the outer wall structure 106 is formed also using the above-described stereolithography technique (third step). To form the outer wall structure 106, first, portions that serve as five surfaces of the rectangular outer wall structure 106 are photo-cured, and then the uncured photo-curable resin is removed, for example. In this manner, the five surfaces of the rectangular outer wall structure 106 are formed, and a space is defined inside. Thereafter, the remaining one surface of the rectangular outer wall structure 106 is formed by the stereolithography technique, and thus the outer wall structure 106 having a hollow structure can be formed.

Second Embodiment

Next, an optical connection structure according to a second embodiment of the present invention is described with reference to FIGS. 3, 4A and 4B.

The optical connection structure includes the first optical device 101 and the second optical device 102, and the first optical waveguide layer 103 of the first optical device 101 and the second optical waveguide layer 104 of the second optical device 102 are optically connected by the resin optical waveguide 105. The resin optical waveguide 105 is composed of a resin core 105a composed of a light-transmitting resin, and a cladding composed of air surrounding the resin core 105a. The first optical waveguide layer 103 includes a plurality of optical waveguides with cores 103a.

The second optical waveguide layer 104 also includes a plurality of optical waveguides with cores 104a. These configurations are the same as those of the first embodiment described above.

In addition, in the second embodiment, the first optical device 101 and the second optical device 102 are stacked through the resin layer 113, and they are integrated with each other. The surface at which the first optical waveguide layer 103 is formed in the first optical device 101, and the surface at which the second optical waveguide layer 104 is formed in the second optical device 102 face each other, and the resin layer 113 is sandwiched therebetween. The resin layer 113 is composed of an adhesive, for example, and the resin layer 113 bonds and fixes the first optical device 101 and the second optical device 102 to each other.

In addition, in the second embodiment, the optical waveguide end surface (connection end surface) of the first optical waveguide layer 103 where light enters and exits and the optical waveguide end surface (connection end surface) of the second optical waveguide layer 104 where light enters and exits are disposed to face the same direction. The resin core 105a of the resin optical waveguide 105 optically connects between the connection end surfaces of the first optical waveguide layer 103 and the second optical waveguide layer 104 facing the same direction.

In the second embodiment, one end surface of the resin core 105a and the connection end surface of the core of the optical waveguide of the first optical waveguide layer 103 are formed orthogonal to the waveguide direction, and the surfaces are brought into contact with each other to optically couple the optical waveguide of the first optical waveguide layer 103 and the resin optical waveguide 105 through butt coupling. In addition, the other end surface of the resin core 105a and the connection end surface of the core of the optical waveguide of the second optical waveguide layer 104 are formed orthogonal to the waveguide direction, and the surfaces are brought into contact with each other to optically couple the optical waveguide of the second optical waveguide layer 104 and the resin optical waveguide 105 through butt coupling. In addition, in the second embodiment, the resin core 105a has a structure that is folded at an appropriate curvature in a U-shape or the like.

In addition, an outer wall structure 106a having a hollow structure that houses the resin optical waveguide 105 is provided also in the second embodiment. In the second embodiment, the side surface of the resin layer 113 on the connection end surface side described above is a part of the outer wall structure 106a.

Figure 3:
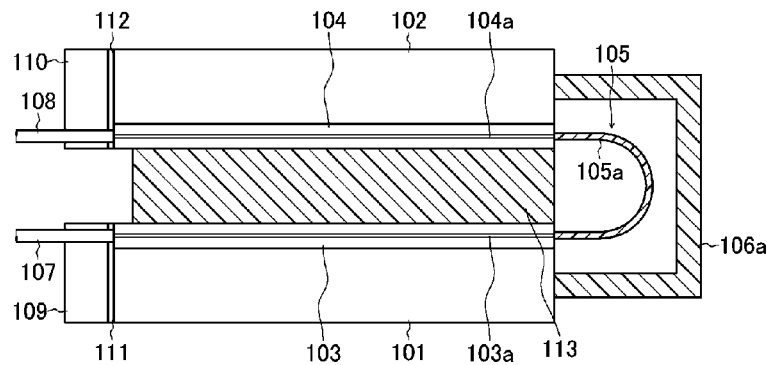
FIG. 3 is a cross-sectional view illustrating a configuration of an optical connection structure according to a second embodiment of the present invention.
Figure 4A:
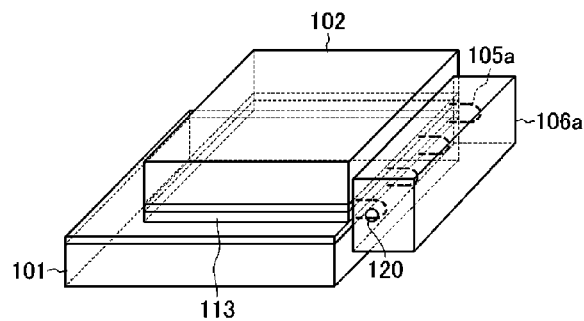
FIG. 4A is a perspective view illustrating a configuration of the optical connection structure according to the second embodiment of the present invention.

Note that, as illustrated in FIG. 3, an optical fiber 107 is optically connected to the other connection end of the first optical waveguide layer 103 in the second embodiment. The optical fiber 107 is fixed to one end surface (side surface) of the first optical device 101 by a fixing member 109 through an adhesive layer 111 composed of an adhesive. In addition, an optical fiber 108 is optically connected to the other connection end of the second optical waveguide layer 104. The optical fiber 108 is fixed to one end surface (side surface) of the second optical device 102 by a fixing member 110 through an adhesive layer 112 composed of an adhesive.

Here, in the second embodiment, when the interval between the respective connection end surfaces of the first optical device 101 and the second optical device 102 facing the same direction is, for example, approximately 100 µm, the curvature radius of the folded structure of the resin core 105a of the resin optical waveguide 105 that optically connects therebetween is approximately 100 µm. Since this value is a very small value, a very significant radiation loss is caused when a typical optical fiber or the like is used.

In this regard, in the resin optical waveguide 105, the cladding is composed of air and the diameter of the resin core 105a is 10 µm or smaller. Thus, light can be guided with almost no radiation loss even when the bending radius is as small as approximately 100 µm.

The resin core 105a and the outer wall structure 106a of the second embodiment can also be formed by the above-described stereolithography technique. In addition, as illustrated in FIG. 4A, the outer wall structure 106a may include a micro hole 120. The outer wall structure 106a including the hole 120 can be formed by photo-curing a photo-curable resin into the shape of the outer wall structure 106a, and then removing the uncured optical resin located inside through the hole 120. The hole 120 functions as a flow path for removing the uncured portion. By dissolving the uncured portion with an appropriate solvent and ejecting the portion through the hole 120, the outer wall structure 106a having a hollow structure is obtained.

Figure 4B:
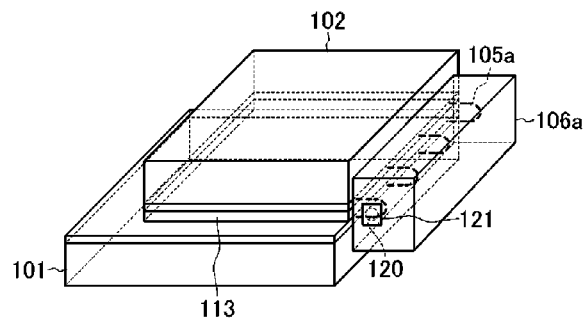
FIG. 4B is a perspective view illustrating a configuration of the optical connection structure according to the second embodiment of the present invention.

In addition, by closing the hole 120 with a plate-shaped lid member 121 composed of a resin or the like after the hollow structure is obtained in the above-described manner, the outer wall structure 106a can be provided with an air-tight structure as illustrated in FIG. 4B.

Also in the second embodiment, since the resin optical waveguide 105 is housed in the state where it is covered with the outer wall structure 106a, it is possible to suppress the attachment of the surrounding dust, debris and the like to the resin core 105a. Thus, as in the first embodiment described above, an increase in the radiation loss of the light and the like can be suppressed, and a low-loss property can be reliably maintained. In addition, the resin core 105a can be prevented from being accidentally touched and broken, and the mechanical reliability can be increased.

Third Embodiment

Figure 5:
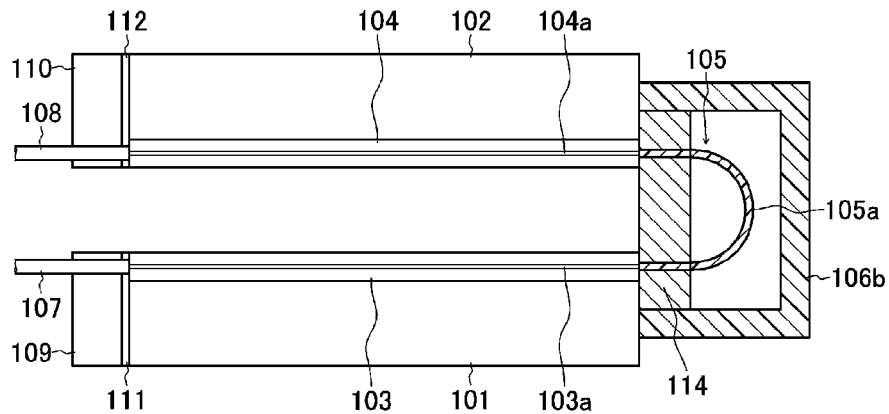
FIG. 5 is a cross-sectional view illustrating a configuration of an optical connection structure according to a third embodiment of the present invention.

Next, an optical connection structure according to a third embodiment of the present invention is described with reference to FIG. 5.

The optical connection structure includes the first optical device 101 and the second optical device 102, and the first optical waveguide layer 103 of the first optical device 101 and the second optical waveguide layer 104 of the second optical device 102 are optically connected by the resin optical waveguide 105. The resin optical waveguide 105 is composed of a resin core 105a composed of a light-transmitting resin, and a cladding composed of air surrounding the resin core 105a. The first optical waveguide layer 103 includes a plurality of optical waveguides with cores 103a. The second optical waveguide layer 104 also includes a plurality of optical waveguides with cores 104a. These configurations are the same as those of the first and second embodiments described above.

In addition, in the third embodiment, the surface at which the first optical waveguide layer 103 is formed in the first optical device 101, and the surface at which the second optical waveguide layer 104 is formed in the second optical device 102 are disposed to face each other. While the arrangement of the first optical device 101 and the second optical device 102 is the same as that of the second embodiment described above, the resin layer is not disposed between the first optical device 101 and the second optical device 102, but the space (air layer) is disposed therebetween in the third embodiment.

In addition, also in the third embodiment, the connection end surface of the first optical waveguide layer 103 and the connection end surface of the second optical waveguide layer 104 are disposed to face the same direction, and the resin core 105a of the resin optical waveguide 105 optically connects between the connection end surfaces as in the second embodiment. Also in the third embodiment, one end surface of the resin core 105a and the connection end surface of the core of the optical waveguide of the first optical waveguide layer 103 are formed perpendicular to the waveguide direction, and the resin optical waveguide 105 and the optical waveguide of the first optical waveguide layer 103 are optically connected through butt coupling as in the second embodiment described above. In addition, the other end surface of the resin core 105a and the connection end surface of the core of the optical waveguide of the second optical waveguide layer 104 are formed perpendicular to the waveguide direction, and the resin optical waveguide 105 and the optical waveguide of the second optical waveguide layer 104 are optically connected through butt coupling. In addition, also in the third embodiment, the resin core 105a has a structure that is folded at an appropriate curvature in a U-shape or the like.

Note that, also in the third embodiment, the optical fiber 107 is optically connected to the other connection end of the first optical waveguide layer 103. The optical fiber 107 is fixed to the first optical device 101 by the fixing member 109. The fixing member 109 is bonded to one end surface (side surface) of the first optical device 101 through the adhesive layer 111 composed of an adhesive. In addition, an optical fiber 108 is optically connected to the other connection end of the second optical waveguide layer 104. The optical fiber 108 is fixed to the second optical device 102 by the fixing member 110. The fixing member 110 is bonded to one end surface (side surface) of the second optical device 102 through the adhesive layer 112 composed of an adhesive.

In the third embodiment, in addition to the configuration described above, a linear part of the resin core 105a extending in the waveguide direction from the connection end surface of the first optical waveguide layer 103 and the connection end surface of the second optical waveguide layer 104 is embedded in a cladding part 114 composed of a resin. The cladding part 114 is disposed to bridge the gap between the side surface of the first optical device 101 including the connection end surface of the first optical waveguide layer 103 and the side surface of the second optical device 102 including the connection end surface of the second optical waveguide layer 104.

In addition, also in the third embodiment, an outer wall structure 106b having a hollow structure that houses the resin optical waveguide 105 is provided. In the third embodiment, the cladding part 114 is a part of the outer wall structure 106a.

In the third embodiment, in the linear portion, the resin optical waveguide 105 is composed of the resin core 105a and the cladding part 114. On the other hand, the resin optical waveguide 105 in the bent portion having a U-shape is composed of the resin core 105a and the cladding composed of air.

The linear portion of the resin optical waveguide 105 has almost no light radiation loss even when the refractive index difference between the core and the cladding is relatively small. Therefore, the linear portion of the resin optical waveguide 105 can guide the light with almost no loss even when the cladding part 114 composed of a resin having a refractive index greater than 1 is provided.

On the other hand, in the resin optical waveguide 105 in the bent portion, the cladding is composed of air so that the refractive index difference between the core and the cladding is sufficiently high. Thus, radiation loss can be prevented even with a small bending radius.

In addition, in the third embodiment, the linear portion of the resin core 105a is embedded in the cladding part 114, and the bent portion of the resin core 105a is surrounded by the outer wall structure 106b having a hollow structure. Thus, as in the first and second embodiments described above, it is possible to suppress the attachment of the surrounding dust, debris and the like to the resin core 105a and a low-loss property can be reliably maintained. In addition, in the third embodiment, since the linear portion of the resin core 105a is embedded in the cladding part 114 and fixed, the mechanical strength can be increased, and the mechanical reliability can be further enhanced. Note that the configuration in which the cladding part composed of a resin is provided in the linear part of the resin core may be applied also to the configuration of the thermally insulating connection in the first embodiment described above.

Fourth Embodiment

Next, an optical connection structure according to a fourth embodiment of the present invention is described with reference to FIG. 6.

The optical connection structure includes the first optical device 101 and the second optical device 102, and the first optical waveguide layer 103 of the first optical device 101 and the second optical waveguide layer 104 of the second optical device 102 are optically connected by the resin optical waveguide 105. The resin optical waveguide 105 is composed of a resin core 105a composed of a light-transmitting resin, and a cladding composed of air surrounding the resin core 105a. The first optical waveguide layer 103 includes a plurality of optical waveguides with cores 103a. The second optical waveguide layer 104 also includes a plurality of optical waveguides with cores 104a.

In addition, the first optical device 101 and the second optical device 102 are stacked through the resin layer 113, and they are integrated. In addition, the connection end surface of the first optical waveguide layer 103 and the connection end surface of the second optical waveguide layer 104 are disposed to face the same direction. One end surface of the resin core 105a and the connection end surface of the core of the optical waveguide of the first optical waveguide layer 103 are formed perpendicular to the waveguide direction, and the resin optical waveguide 105 and the optical waveguide of the first optical waveguide layer 103 are optically connected through butt coupling. In addition, the other end surface of the resin core 105a and the connection end surface of the core of the optical waveguide of the second optical waveguide layer 104 are formed perpendicular to the waveguide direction, and the resin optical waveguide 105 and the optical waveguide of the second optical waveguide layer 104 are optically connected through butt coupling. In addition, also in the third embodiment, the resin core 105a has a structure that is folded at an appropriate curvature in a U-shape or the like.

In addition, the outer wall structure 106a having a hollow structure that houses the resin optical waveguide 105 is provided. In the fourth embodiment, the side surface of the resin layer 113 on the connection end surface side described above is a part of the outer wall structure 106a.

In addition, the optical fiber 107 is optically connected to the other connection end of the first optical waveguide layer 103. The optical fiber 107 is fixed to one end surface (side surface) of the first optical device 101 by a fixing member 109 through an adhesive layer 111 composed of an adhesive. In addition, an optical fiber 108 is optically connected to the other connection end of the second optical waveguide layer 104. The optical fiber 108 is fixed to one end surface (side surface) of the second optical device 102 by a fixing member 110 through an adhesive layer 112 composed of an adhesive.

The configurations described above are the same as those of the second embodiment. In the fourth embodiment, a support beam 115 that supports and fixes the resin core 105a to the inner wall of the outer wall structure 106a is provided. The inner wall of the outer wall structure 106a and the support beam 115, and the resin core 105a and the support beam 115 are mechanically connected to each other.

In addition, the contact area between the resin core 105a and the support beam 115 is set to a value equal to or smaller than the core diameter of the resin core 105a. In addition, the support beam 115 is connected so as to be orthogonal to the extending direction of the resin core 105a. The support beam 115 is properly connected to the resin core 105a so as not to increase the optical waveguide loss of the resin optical waveguide 105.

With a cladding composed of air, the resin core 105a that is partially bent in a U-shape is very flexible, and breakage or the like easily occurs in the vicinity of the bent portion. In view of such a state, by providing the support beam 115 to support the resin core 105a, the mechanical strength of the resin core 105a can be increased, and the deflection and breakage described above can be prevented.

At the connecting point between the support beam 115 and the resin core 105a described above, the connection angle of the support beam 115 to the resin core 105a with respect to the waveguide direction of the resin optical waveguide 105 is important. When the connection angle of the support beam 115 is insufficient, light may leak toward the support beam 115 as in a well-known light splitter or directional coupler. Here, by setting the connection angle of the support beam 115 to a value closer to 90 degrees, leakage of light to the support beam 115 can be reduced. In particular, by setting the connection angle of the support beam 115 to 90 degrees, leakage of light to the support beam 115 can be minimized.

Preferably, the contact area between the support beam 115 and the resin core 105a is as small as possible so that the connecting point between the support beam 115 and the resin core 105a is not a scattering point. From this perspective, it is more preferable that the contact area between the support beam 115 and the resin core 105a be approximately ½ or smaller of the diameter of the resin core 105a. In this manner, the mechanical strength of the resin core 105a can be increased without increasing the influence of the light radiation loss. In addition, the resin core 105a, the support beam 115, and the outer wall structure 106a can be formed in the same stereolithography process, which is a significantly advantageous feature in terms of manufacturing.

Figure 6:
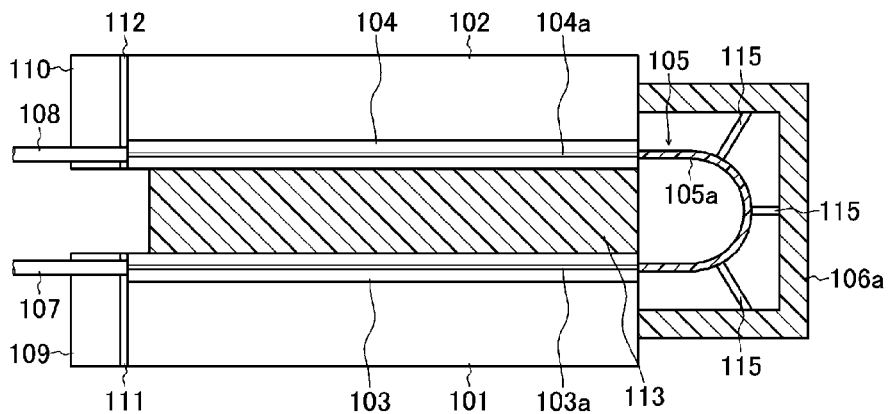
FIG. 6 is a cross-sectional view illustrating a configuration of an optical connection structure according to a fourth embodiment of the present invention.

Note that, the number of the support beams 115 is not limited to three as illustrated in FIG. 6, and may be four, five or one. In addition, the shape of the support beam 115 is not limited to a rod shape, and may be freely set in accordance with the required mechanical strength as desired and the above-described optical perspective. Naturally, the support beam may be applied also to the optical connection structure of the first embodiment described above.

As described above, according to embodiments of the present invention, the resin core of the resin optical waveguide that optically connects the first optical waveguide layer and the second optical waveguide layer is housed in the hollow outer wall structure, and it is thus possible to suppress light radiation loss due to attachment of foreign materials and the like in the resin optical waveguide including the cladding composed of air.

It should be noted that the present invention is not limited to the embodiments described above and it will be apparent that many modifications and combinations can be made by a person having ordinary skill in the art without departing from the technical spirit of the present invention.

REFERENCE SIGNS LIST

101 . . . First optical device
102 . . . Second optical device
103 . . . First optical waveguide layer
104 . . . Second optical waveguide layer
105 . . . Resin optical waveguide
105a . . . Resin core
106 . . . Outer wall structure

The invention claimed is:

1. An optical connection structure comprising:
a first optical device including a first optical waveguide layer providing a first optical waveguide;
a second optical device including a second optical waveguide layer providing a second optical waveguide;
a resin optical waveguide configured to optically connect the first optical waveguide layer and the second optical waveguide layer, the resin optical waveguide comprising:
a resin core composed of a light-transmitting resin; and
a cladding composed of air surrounding the resin core, wherein the air of the cladding directly contacts the resin core; and
an outer wall structure having a hollow shape and configured to house the resin optical waveguide, wherein the outer wall structure is composed of the light-transmitting resin.

2. The optical connection structure according to claim 1 further comprising a support beam configured to support and fix the resin core to an inner wall of the outer wall structure.

3. The optical connection structure according to claim 1, wherein the resin core is optically connected in a thermally insulating manner to the first optical waveguide layer or the second optical waveguide layer by making contact at a side surface of the resin core along a waveguide direction of a core of the optical waveguide of the first optical waveguide layer or the second optical waveguide layer.

4. The optical connection structure according to claim 1, wherein both an end surface of the resin core and a connection end surface of a core of the first optical waveguide or the second optical waveguide are formed perpendicular to a waveguide direction and are optically connected through butt coupling.

5. A method of forming an optical connection structure, comprising:
preparing a first optical device including a first optical waveguide layer of a first optical waveguide and a second optical waveguide layer of a second optical waveguide;
curing a photo-curable resin through irradiation with exposure light to form a light-transmitting resin, wherein the light transmitting resin provides a resin core;
optically connecting the first optical waveguide layer and the second optical waveguide layer by a resin optical waveguide including the resin core and a cladding composed of air surrounding the resin core, wherein the air of the cladding directly contacts the resin core; and forming an outer wall structure having a hollow shape and housing the resin optical waveguide wherein the outer wall structure is composed of the light-transmitting resin.

6. The method of forming the optical connection structure according to claim 5 further comprising forming a support beam, wherein the support beam supports and fixes the resin core to an inner wall of the outer wall structure.

7. The method of forming the optical connection structure according to claim 5, wherein the resin core is optically connected in a thermally insulating manner to the first optical waveguide layer or the second optical waveguide layer by making contact at a side surface of the resin core along a waveguide direction of a core of the optical waveguide of the first optical waveguide layer or the second optical waveguide layer.

8. The method of forming the optical connection structure according to claim 5, wherein both an end surface of the resin core and a connection end surface of a core of the first optical waveguide or the second optical waveguide are formed perpendicular to a waveguide direction and are optically connected through butt coupling.

9. An optical connection structure comprising:
   a first optical device including a first optical waveguide layer of a first optical waveguide;
   a second optical device including a second optical waveguide layer of a second optical waveguide;
   a resin optical waveguide configured to optically connect the first optical waveguide layer and the second optical waveguide layer, the resin optical waveguide comprising a resin core composed of a light-transmitting resin, wherein air surrounds and directly contacts the resin core; and
   an outer wall structure having a hollow shape and configured to house the resin optical waveguide, wherein the air is disposed between the resin core and the outer wall structure wherein the outer wall structure is composed of the light-transmitting resin.

10. The optical connection structure according to claim 9 further comprising a support beam configured to support and fix the resin core to an inner wall of the outer wall structure.

11. The optical connection structure according to claim 9, wherein the resin core is optically connected in a thermally insulating manner to the first optical waveguide layer or the second optical waveguide layer by making contact at a side surface of the resin core along a waveguide direction of a core of the optical waveguide of the first optical waveguide layer or the second optical waveguide layer.

12. The optical connection structure according to claim 9, wherein both an end surface of the resin core and a connection end surface of a core of the first optical waveguide or the second optical waveguide are formed perpendicular to a waveguide direction and are optically connected through butt coupling.

* * * * *